US012254076B2

(12) United States Patent
Nishiyama et al.

(10) Patent No.: US 12,254,076 B2
(45) Date of Patent: Mar. 18, 2025

(54) CONTROL SYSTEM AND CONTROL METHOD

(71) Applicant: OMRON Corporation, Kyoto (JP)

(72) Inventors: Yoshihide Nishiyama, Kyoto (JP); Yuta Nagata, Kyoto (JP)

(73) Assignee: OMRON CORPORATION, Kyoto (JP)

(*) Notice: Subject to any disclaimer, the term of this patent is extended or adjusted under 35 U.S.C. 154(b) by 256 days.

(21) Appl. No.: 17/623,169

(22) PCT Filed: Mar. 5, 2020

(86) PCT No.: PCT/JP2020/009376
§ 371 (c)(1),
(2) Date: Dec. 27, 2021

(87) PCT Pub. No.: WO2021/005831
PCT Pub. Date: Jan. 14, 2021

(65) Prior Publication Data
US 2022/0245233 A1 Aug. 4, 2022

(30) Foreign Application Priority Data
Jul. 8, 2019 (JP) .................. 2019-126824

(51) Int. Cl.
G06F 21/44 (2013.01)
G06F 13/42 (2006.01)
(Continued)

(52) U.S. Cl.
CPC .............. G06F 21/44 (2013.01); G06F 13/42 (2013.01); G06F 21/33 (2013.01); G06F 21/57 (2013.01)

(58) Field of Classification Search
CPC .......... G06F 21/44; G06F 21/33; G06F 21/57; G06F 13/42
(Continued)

(56) References Cited

U.S. PATENT DOCUMENTS 8,863,256 B1* 10/2014 Addepalli ............. H04W 40/20
713/168
9,656,365 B1* 5/2017 Halstead ................. B24B 33/02
(Continued)

FOREIGN PATENT DOCUMENTS

EP 3 241 304 A1 11/2017
EP 3 951 629 A1 2/2022
(Continued)

OTHER PUBLICATIONS

International Search Report for PCT/JP2020/009376 dated Jun. 23, 2020 [PCT/ISA/210].
(Continued)

Primary Examiner — Dant B Shaifer Harriman
(74) Attorney, Agent, or Firm — Sughrue Mion, PLLC

(57) ABSTRACT

A control system includes plural units. The plural units include a master unit connected to a bus and a slave unit connected to the bus, the slave unit communicating with the master unit via the bus. The master unit includes a nonvolatile memory that stores first security information as information to be concealed, and the slave unit includes a volatile memory. The slave unit receives the first security information from the master unit at a predetermined timing and stores the first security information in the volatile memory.

10 Claims, 15 Drawing Sheets

(51) Int. Cl.
*G06F 21/33* (2013.01)
*G06F 21/57* (2013.01)

(58) Field of Classification Search
USPC .......................................................... 713/168
See application file for complete search history.

(56) References Cited

U.S. PATENT DOCUMENTS

| | | | |
|---|---|---|---|
| 2001/0013019 A1* | 8/2001 | Sugiyama | G06Q 20/04 |
| | | | 705/41 |
| 2005/0283599 A1* | 12/2005 | Zimmerman | G06F 9/4403 |
| | | | 713/2 |
| 2011/0173447 A1* | 7/2011 | Zhang | H04B 3/542 |
| | | | 713/168 |
| 2013/0151844 A1* | 6/2013 | Messerschmidt | H04L 9/0827 |
| | | | 713/153 |
| 2015/0046710 A1 | 2/2015 | Clish et al. | |
| 2016/0021144 A1* | 1/2016 | Lin | H04W 12/084 |
| | | | 726/6 |
| 2016/0165077 A1 | 6/2016 | Shibata | |
| 2016/0261771 A1 | 9/2016 | Fujii | |
| 2018/0301196 A1* | 10/2018 | Tailliet | G06F 12/0246 |
| 2019/0342170 A1* | 11/2019 | Pathak | H04L 41/0869 |
| 2020/0151311 A1* | 5/2020 | Noe | G06Q 20/385 |

FOREIGN PATENT DOCUMENTS

| | | |
|---|---|---|
| JP | 2010-079354 A | 4/2010 |
| JP | 2016-110268 A | 6/2016 |
| JP | 2016-162314 A | 9/2016 |
| JP | 2016-194808 A | 11/2016 |
| JP | 2018-128722 A | 8/2018 |

OTHER PUBLICATIONS

Written Opinion for PCT/JP2020/009376 dated Jun. 23, 2020 [PCT/ISA/237].

Extended European Search Report issued Jun. 30, 2023 in European Application No. 20836615.3.

Zakarya Drias, et al., "Analysis of Cyber Security for Industrial Control Systems" 2015 International Conference on Cyber Security of Smart cities, Industrial Control System and Communications (SSIC), IEEE, 2015 (8 pages).

Office Action issued Jul. 4, 2023 in Japanese Application No. 2019-126824.

* cited by examiner

FIG.15

| KEY INFORMATION | 330B(330) |
|---|---|
| DIGITAL CERTIFICATE | certfication1 (publicKey1) |
| PRIVATE KEY | privateKey1 |
| ⋮ | ⋮ |

CONTROL SYSTEM AND CONTROL METHOD

CROSS REFERENCE TO RELATED APPLICATIONS

This application is a National Stage of International Application No. PCT/JP2020/009376 filed Mar. 5, 2020, claiming priority based on Japanese Patent Application No. 2019-126824 filed Jul. 8, 2019, the entire contents of each of which being herein incorporated by reference in their entireties.

TECHNICAL FIELD

The present disclosure relates to a technique for managing security information in a control system including a plurality of units.

BACKGROUND ART

At production sites using factory automation (FA), control units such as programmable logic controllers (PLCs) are used to control various devices. In recent years, control units that are connectable to external devices have become widespread. Regarding such a control unit, PTL 1 (Japanese Patent Laying-Open No. 2016-194808) discloses a PLC configured to access a database of an external device.

CITATION LIST

Patent Literature

PTL 1: Japanese Patent Laying-Open No. 2016-194808

SUMMARY OF INVENTION

Technical Problem

Various functional units may be connected to the control unit. Various applications can be installed in each functional unit. Users can add functional units and install applications as needed.

Each functional unit is independent of other functional units, and it is necessary to manage information such as account information and digital certificates (hereinafter, also referred to as "security information") for each functional unit. Thus, with an increasing number of functional units, the user may set an easy password or forget the password, and management of security information becomes complicated. Therefore, a technique for centrally managing security information in a control system including a plurality of units is desired.

Solution to Problem

In one example of the present disclosure, a control system including a plurality of units is provided. The plurality of units includes a master unit connected to a bus and a slave unit connected to the bus and communicating with the master unit via the bus. The master unit has a nonvolatile memory that stores first security information as information to be concealed. The slave unit has a volatile memory. The slave unit receives the first security information from the master unit at a predetermined timing and stores the first security information in the volatile memory.

In the present disclosure, the slave unit stores security information received from the master unit in the volatile memory. As a result, the security information disappears from the master unit each time power supply to the control system is stopped. On the other hand, security information stored in the nonvolatile memory of the master unit does not disappear even when the power supply to the control system is stopped. As a result, the security information can be centrally managed.

In one example of the present disclosure, the predetermined timing includes a timing at which power of the control system is turned on.

In the present disclosure, the slave unit receives security information from the master unit each time the power of the control system is turned on, and thus the security information can be kept updated.

In one example of the present disclosure, the first security information includes account information of a user. In response to reception of a request for data access to the slave unit from an external device configured to be communicable with the slave unit, the slave unit requests the external device to input account information, and in a case where the account information input to the external device is registered in the first security information stored in the volatile memory, the slave unit allows data access to the slave unit by the external device.

In the present disclosure, the slave unit can authenticate the user on the basis of the account information received from the master unit.

In one example of the disclosure, the first security information includes a digital certificate. The first security information includes a digital certificate, and in response to reception of a request for acquisition of data stored in the slave unit from the external device configured to be communicable with the slave unit, the slave unit sends the digital certificate stored in the volatile memory to the external device.

In the present disclosure, the slave unit can communicate with the external device on the basis of the digital certificate received from the master unit.

In one example of the present disclosure, the slave unit further includes a nonvolatile memory that stores second security information as information to be concealed. In a case where there is conflicting information between information included in the first security information and information included in the second security information, the slave unit determines which of the conflicting information to prioritize in accordance with a predetermined rule.

The present disclosure resolves information conflict between the first security information and the second security information.

In one example of the present disclosure, the master unit receives the second security information from the slave unit at the predetermined timing and stores the second security information in the volatile memory of the master unit.

In the present disclosure, the security information can be distributed to the master unit and the slave unit and managed.

In one example of the present disclosure, the slave unit includes a control unit that controls a drive device.

In the present disclosure, the security information used in the control unit can be centrally managed by the master unit.

Another example of the present disclosure provides a control method of a control system including a plurality of units. The plurality of units includes a master unit connected to a bus and a slave unit connected to the bus and communicating with the master unit via the bus. The control method includes storing, by the master unit, first security information as information to be concealed in a nonvolatile memory of the master unit, receiving, by the slave unit, the first security information from the master unit at a predetermined timing, and storing, by the slave unit, the first security information received from the master unit in a volatile memory of the slave unit.

In the present disclosure, the slave unit stores security information received from the master unit in the volatile memory. As a result, the security information disappears from the master unit each time power supply to the control system is stopped. On the other hand, in the master unit, security information stored in the nonvolatile memory of the master unit does not disappear even when the power supply to the control system is stopped. As a result, the security information can be centrally managed.

BRIEF DESCRIPTION OF DRAWINGS

FIG. 15 is a diagram of key information included in the security information.

DESCRIPTION OF EMBODIMENTS

Hereinafter, an embodiment of the present invention will be described with reference to the drawings. In the following description, the same parts and elements are designated by the same reference signs. Names and functions of such parts and elements are the same. Therefore, the detailed description of the parts and elements will not be repeated.

A. Application Example

Figure 1:
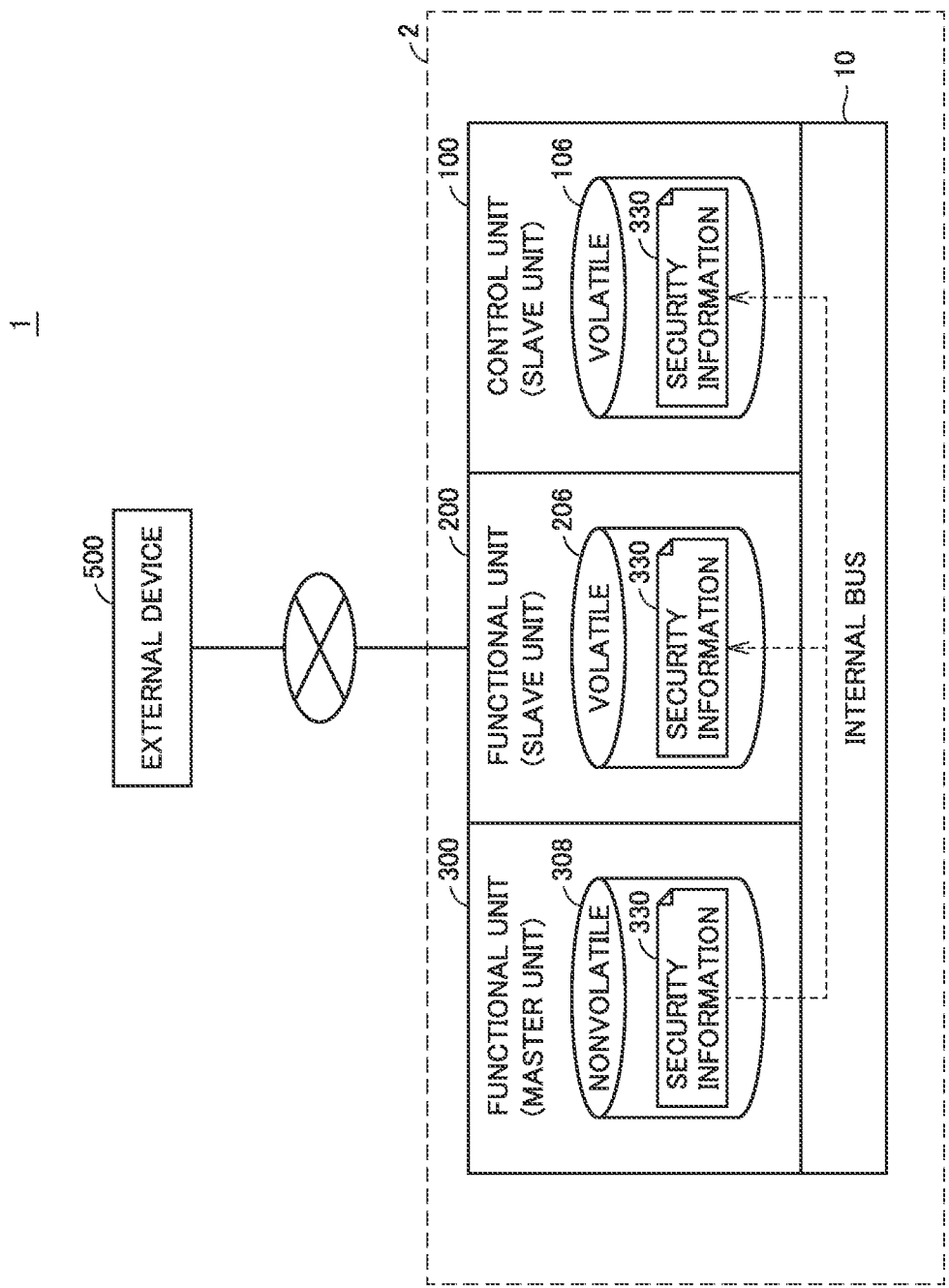
FIG. 1 is a diagram illustrating a configuration example of an information processing system according to an embodiment.

An application example of the present invention will be described with reference to FIG. 1. FIG. 1 is a diagram illustrating a configuration example of an information processing system 1 according to the embodiment.

Information processing system 1 includes one or more control systems 2 and one or more external devices 500. Control system 2 is an FA system that automates a production process. Control system 2 includes a control unit 100 and functional units 200 and 300. Functional unit 300 functions as a master unit. Control unit 100 and functional unit 200 function as slave units. A master-slave relationship is set in advance.

Functional unit 200 and external device 500 are connected to an external network. Communication between functional unit 200 and external device 500 is achieved by Ethernet (registered trademark). External device 500 is, for example, a laptop or desktop personal computer (PC), a tablet terminal, a smartphone, a human machine interface (HMI), or another information processing terminal.

Control unit 100, functional unit 200, and functional unit 300 are connected to each other by an internal bus 10. These units communicate with each other via internal bus 10.

Control unit 100 is, for example, a PLC. Control unit 100 controls a drive device (not shown) in accordance with a user program designed in advance. The drive device includes various industrial devices that automate the production process. Examples of the drive device include a robot controller, a servo driver, an arm robot controlled by the robot controller, a servo motor controlled by the servo driver, and the like. Further, the drive device may include a visual sensor for photographing working, other devices used in the production process, and the like.

Control unit 100 has a volatile memory 106. Volatile memory 106 is a general term for a memory in which stored information is erased when power supply stops. Volatile memory 106 is, for example, a random access memory (RAM) such as static random access memory (SRAM) or dynamic random access memory (DRAM).

Functional unit 200 is connected to control unit 100. Various applications for providing various services related to control system 2 may be installed in functional unit 200. Functional unit 200 has a volatile memory 206. Volatile memory 206 is, for example, RAM such as SRAM or DRAM.

Functional unit 300 is a unit that centrally manages security information 330 as information to be concealed. Functional unit 300 is, for example, a security guard unit (SGU). Security information 330 includes, for example, account information and digital certificates used by various units. Security information 330 is stored in a nonvolatile memory 308 of functional unit 300.

Nonvolatile memory 308 is a general term for memory that can continue to hold information without any power supply. Nonvolatile memory 308 is, for example, a read only memory (ROM), a hard disk, or a flash memory.

Functional unit 300 as a master unit sends security information 330 to control unit 100 and functional unit 200 as the slave units at a predetermined timing. Control unit 100 stores security information 330 received from functional unit 300 in volatile memory 106. Similarly, functional unit 200 stores security information 330 received from functional unit 300 in volatile memory 206.

The timing at which security information 330 is distributed is not limited. In a certain aspect, security information 330 is distributed to the slave units at a timing when power of control system 2 is turned on. In another aspect, security information 330 is distributed to the slave units at predetermined intervals. In still another aspect, security information 330 is distributed to the slave units at a timing of receiving an acquisition instruction or update instruction by a user operation.

As described above, control system 2 has functional unit 300 that centrally manages the security information. This eliminates the need for a user to manage the account information, digital certificates, and the like for each unit, and eliminates complexity of managing the security information. As a result, security holes caused by incorrect or old settings can be prevented. Further, when security information 330 is managed in one place, there will be less places to be confirmed when an abnormality occurs, and the abnormality can be dealt with promptly.

Furthermore, the security information is distributed via internal bus 10, and there is no need to connect to the external network. This reduces possibility that the security information is leaked to outside and improves a security level of control system 2.

Security information 330 is stored in volatile memories 106 and 206. Thus, security information 330 does not remain on the slave units after the power of control system 2 is cut off. On the other hand, security information 330 stored in nonvolatile memory 308 of functional unit 300 does not disappear even when the power supply to control system 2 is stopped. As a result, security information 330 is not duplicated, and security information 330 is centrally managed more reliably.

Further, when security information 330 is centrally managed, the user does not need to take measures against information leakage for all the units. That is, the user can improve the security level by taking measures against information leakage intensively for nonvolatile memory 308 of functional unit 300. For example, when a memory with an encryption function is used for nonvolatile memory 308, a leakage risk of security information 330 can be reduced. Further, since the user only needs to take measures against information leakage only for nonvolatile memory 308, costs can be suppressed.

B. Control System 2

Figure 2:
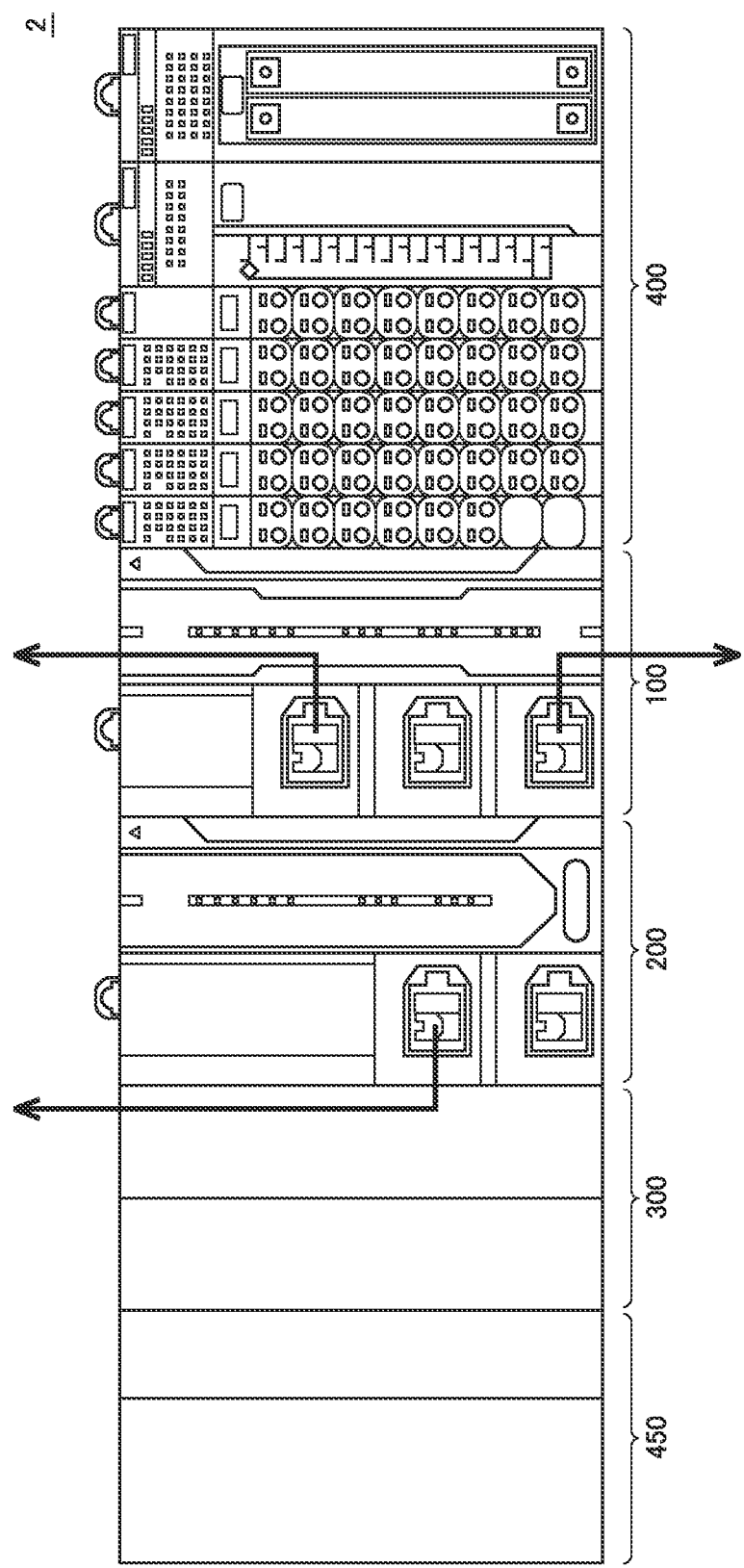
FIG. 2 is an external view illustrating a configuration example of a control system according to the embodiment.

Control system 2 illustrated in FIG. 1 will be described with reference to FIG. 2. FIG. 2 is an external view illustrating a configuration example of control system 2.

With reference to FIG. 2, control system 2 includes one or more control units 100, one or more functional units 200, one or more functional units 300, one or more functional units 400, and a power supply unit 450.

Control unit 100 and functional unit 200 are connected to each other via an arbitrary data transmission line. Control unit 100, functional unit 200, and one or more functional units 300 and 400 are connected to each other via internal bus 10 (see FIG. 1).

Control unit 100 executes central processing in control system 2. Control unit 100 executes a control calculation for controlling a controlled object according to an arbitrarily designed requirement specification. In the configuration example illustrated in FIG. 2, control unit 100 has one or more communication ports. Control unit 100 corresponds to a processing execution unit that executes standard control in accordance with a standard control program.

Functional unit 200 is connected to control unit 100 and is charge of a communication function with other devices. In the configuration example illustrated in FIG. 2, functional unit 200 has one or more communication ports.

Functional unit 300 is an optional unit and is connected to control unit 100 as needed. Functional unit 300 may typically include a security guard unit (SGU), a communication unit having a data exchange function by object linking and embedding for process control unified architecture (OPC UA), an artificial intelligence (AI) unit having a preventive maintenance function by AI, and the like.

Functional unit 400 provides various functions for achieving control for various control targets by control system 2. Functional unit 400 may typically include an I/O unit, a safety I/O unit, a communication unit, a motion controller unit, a temperature control unit, a pulse counter unit, and the like. Examples of the I/O unit include a digital input (DI) unit, a digital output (DO) unit, an analog input (AI) unit, an analog output (AO) unit, a pulse catch input unit, and a composite unit having a mixture of a plurality of types. The safety I/O unit is in charge of I/O processing related to safety control.

Power supply unit 450 supplies power of a predetermined voltage to each unit constituting control system 2.

C. Hardware Configuration Example of Each Unit

Next, a hardware configuration example of each unit constituting control system 2 according to the present embodiment will be described.

c1: Control Unit 100

Figure 3:
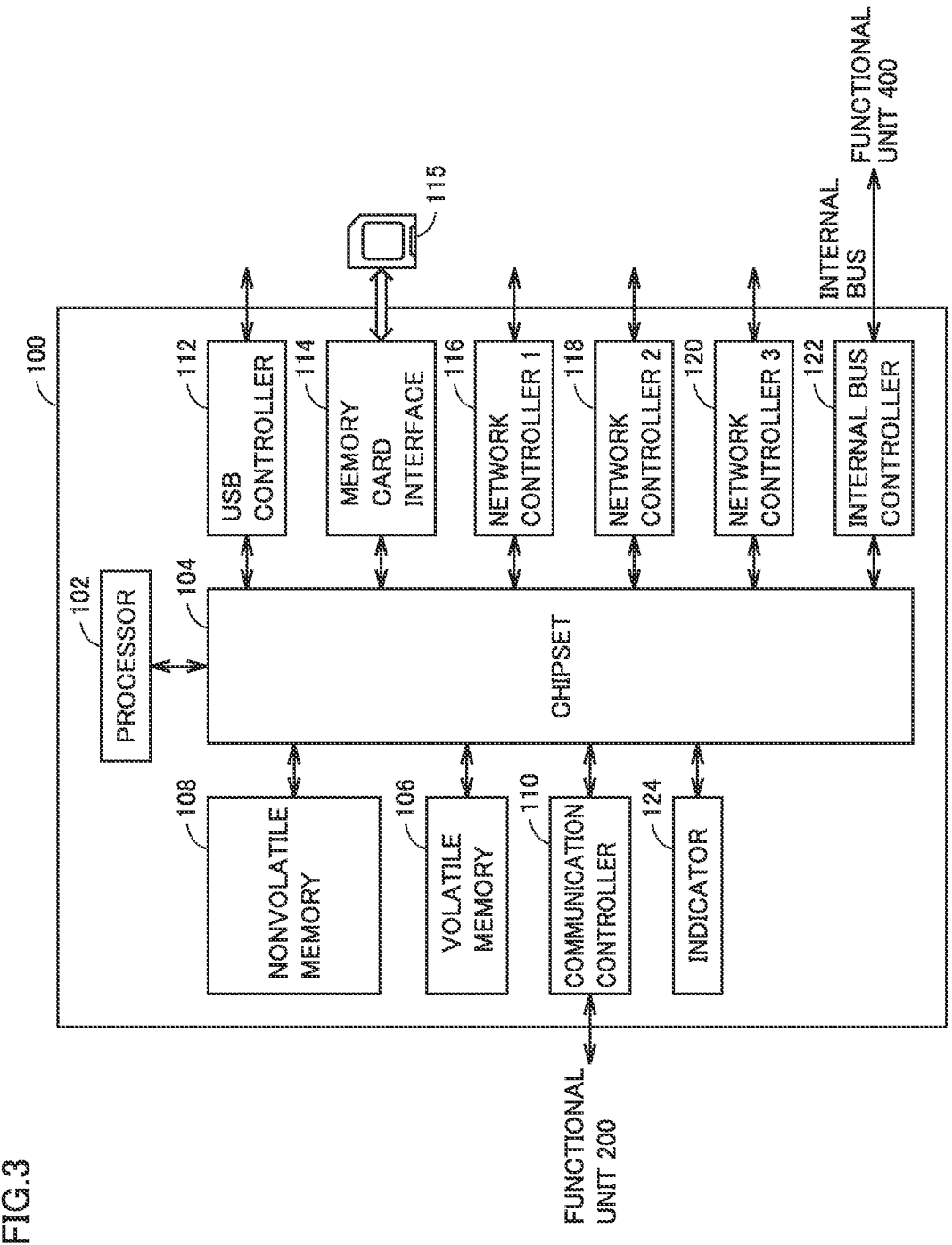
FIG. 3 is a schematic diagram illustrating a hardware configuration example of a control unit constituting the control system according to the embodiment.

FIG. 3 is a schematic diagram illustrating a hardware configuration example of control unit 100 constituting control system 2 according to the present embodiment. With reference to FIG. 3, control unit 100 includes, as main components, a processor 102 such as a central processing unit (CPU) or a graphical processing unit (GPU), a chipset 104, a volatile memory 106, nonvolatile memory 108, a communication controller 110, a universal serial bus (USB) controller 112, a memory card interface 114, network controllers 116, 118, and 120, an internal bus controller 122, and an indicator 124.

Processor 102 reads various programs stored in nonvolatile memory 108, develops the programs in volatile memory 106, and executes the programs to implement control calculation related to standard control and various processing as described later. Chipset 104 mediates a data exchange between processor 102 and each component, and thus implements the processing of control unit 100 as a whole.

In addition to a system program, nonvolatile memory 108 stores a control program that operates in an execution environment provided by the system program.

Communication controller 110 is in charge of exchanging data with functional unit 300. As communication controller 110, for example, a communication chip corresponding to an internal bus, Ethernet, or the like can be adopted.

USB controller 112 is in charge of exchange data with an arbitrary information processing device via USB connection.

A memory card 115 is attachable to and detachable from memory card interface 114, and memory card interface 114 can write data such as a control program and various settings to memory card 115 or read data such as a control program and various settings from memory card 115.

Each of network controllers 116, 118, and 120 is in charge of exchanging data with an arbitrary device via the network. Network controllers 116, 118, and 120 may employ an industrial network protocol such as EtherCAT (registered trademark), EtherNet/IP (registered trademark), DeviceNet (registered trademark), or CompoNet (registered trademark).

Internal bus controller 122 is in charge of exchanging data with functional unit 200, one or more functional units 300, and one or more functional units 400 constituting control system 2. As the internal bus, a communication protocol unique to a manufacturer may be used, or a communication protocol that is the same as or compliant with a protocol of any industrial network may be used.

Indicator 124 notifies an operating state of control unit 100 and the like and includes one or more LEDs disposed on a surface of the unit.

Although FIG. 3 illustrates the configuration example in which necessary functions are provided by processor 102 executing the programs, some or all of these provided functions may be implemented by using a dedicated hardware circuit (for example, an application specific integrated circuit (ASIC), a field-programmable gate array (FPGA), or the like. Alternatively, a main part of control unit 100 may be implemented by using hardware according to a general-purpose architecture (for example, an industrial personal computer based on a general-purpose personal computer). In this case, a plurality of operating systems (OSs) having different uses may be executed in parallel using a virtualization technology, and necessary applications may be executed on each OS.

c2: Functional Unit 200

Figure 4:
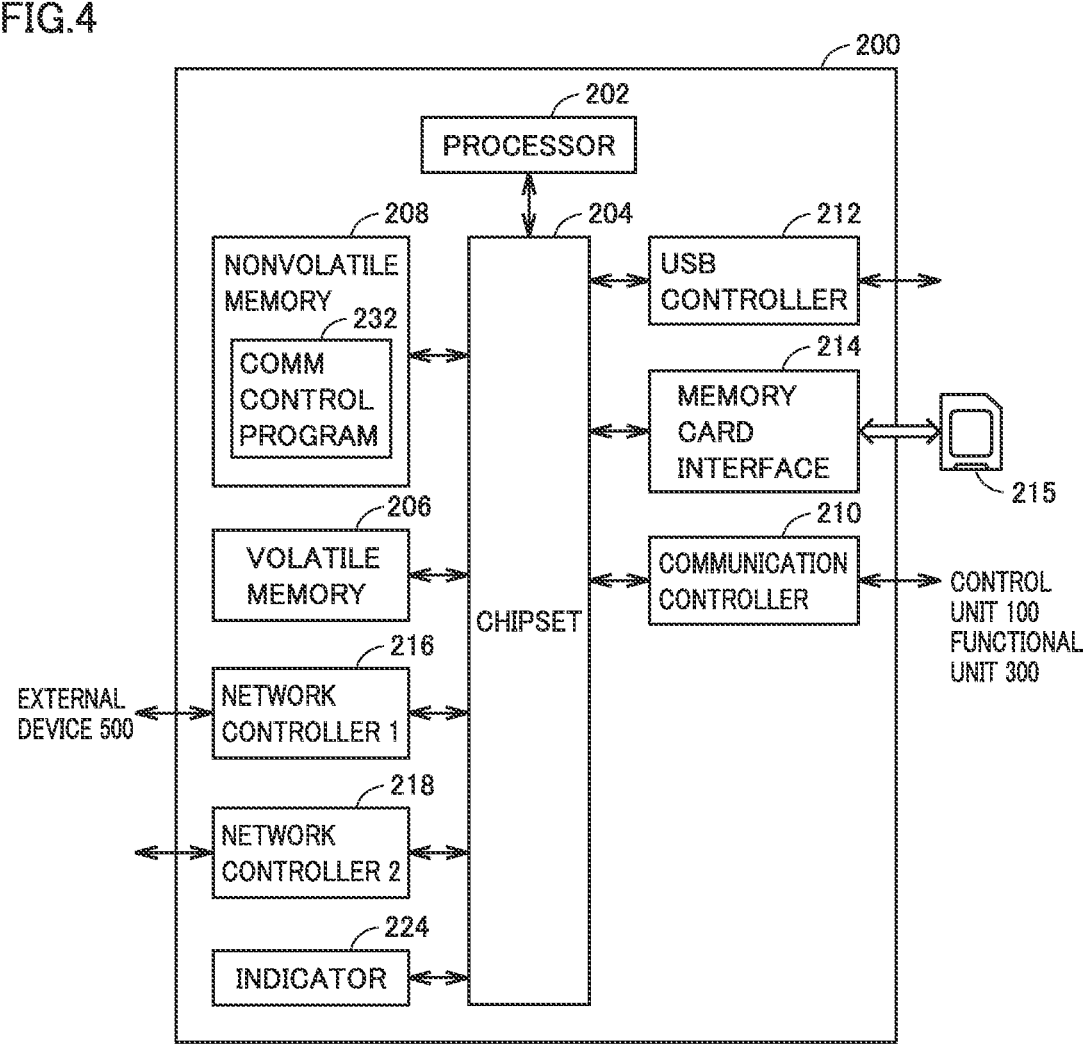
FIG. 4 is a schematic diagram illustrating a hardware configuration example of a functional unit constituting the control system according to the embodiment.

FIG. 4 is a schematic diagram illustrating a hardware configuration example of functional unit 200 constituting control system 2 according to the present embodiment. With reference to FIG. 4, functional unit 200 includes, as main components, a processor 202 such as a CPU or a GPU, a chipset 204, a volatile memory 206, a nonvolatile memory 208, a communication controller 210, and a communication interface 212, a memory card interface 214, network controllers 216 and 218, and an indicator 224.

Processor 202 reads various programs stored in nonvolatile memory 208, develops the programs in volatile memory 206, and executes the programs to implement various communication functions as described later. Chipset 204 mediates data exchange between processor 202 and each component, and thus implements the processing of functional unit 200 as a whole.

In addition to a system program, nonvolatile memory 208 stores various data such as a communication control program 232 that operates in an execution environment provided by the system program.

Communication controller 210 is in charge of exchanging data with control unit 100 and functional unit 300. As communication controller 210, for example, a communication chip corresponding to an internal bus, Ethernet, or the like can be adopted.

Communication interface 212 is in charge of exchanging data with an arbitrary information processing device via USB connection.

A memory card 215 is attachable to and detachable from memory card interface 214, and memory card interface 214 can write data such as a control program and various settings to memory card 215 or read data such as a control program and various settings from memory card 215.

Each of network controllers 216 and 218 is in charge of exchanging data with an arbitrary device via the network. Network controllers 216 and 218 may employ a general-purpose network protocol such as Ethernet. For example, functional unit 200 communicates with external device 500 via network controller 216 or network controller 218.

Indicator 224 notifies an operating state of functional unit 200 and the like and includes one or more LEDs disposed on a surface of the unit.

Although FIG. 4 illustrates the configuration example in which necessary functions are provided by processor 202 executing the programs, some or all of these provided functions may be implemented by using a dedicated hardware circuit (for example, ASIC or FPGA). Alternatively, a main part of functional unit 200 may be implemented by using hardware according to a general-purpose architecture (for example, an industrial personal computer based on a general-purpose personal computer). In this case, a plurality of OSs having different uses may be executed in parallel using a virtualization technology, and necessary applications may be executed on each OS.

c3: Functional Unit 300

Figure 5:
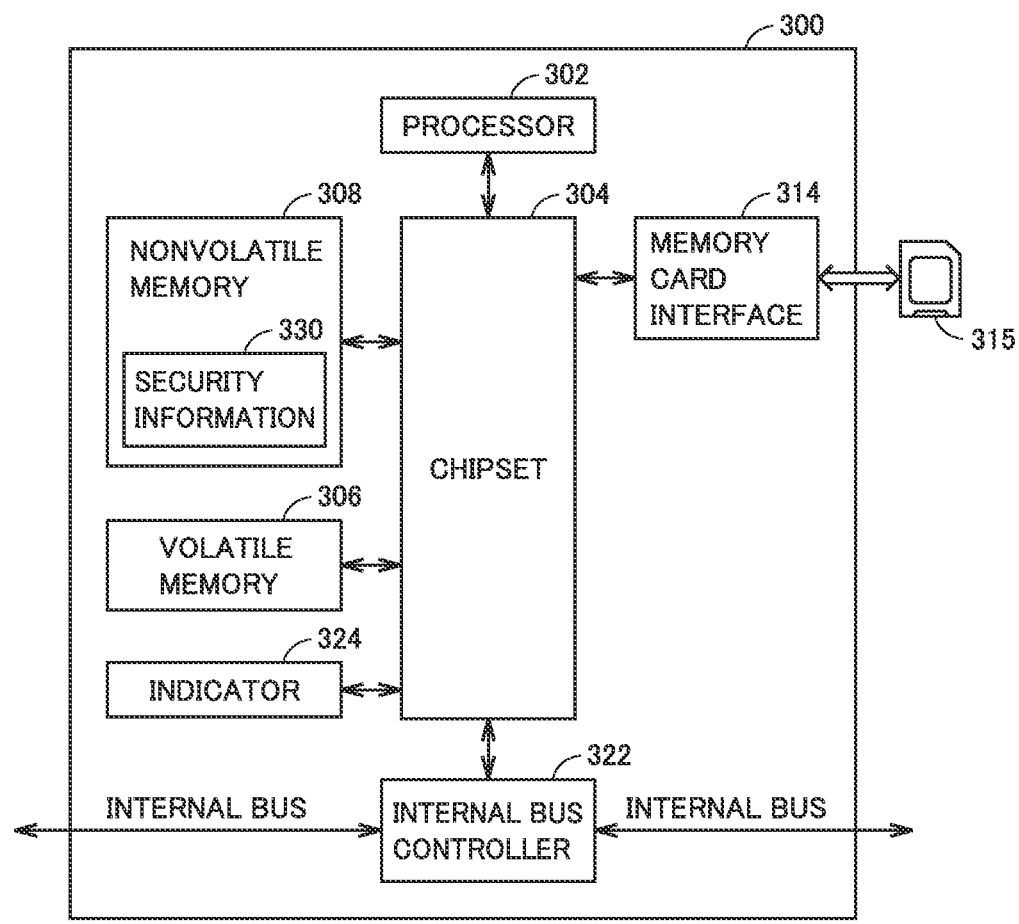
FIG. 5 is a schematic diagram illustrating a hardware configuration example of a functional unit constituting the control system according to the embodiment.

FIG. 5 is a schematic diagram illustrating a hardware configuration example of functional unit 300 constituting control system 2 according to the present embodiment. With reference to FIG. 5, functional unit 300 includes, as main components, a processor 302 such as a CPU or a GPU, a chipset 304, a volatile memory 306, nonvolatile memory 308, a memory card interface 314, an internal bus controller 322, and an indicator 324.

Processor 302 reads various application programs stored in nonvolatile memory 308, develops the application programs in volatile memory 306, executes the application programs to implement a server function and various functions. Chipset 304 mediates data exchange between processor 302 and each component, and thus implements the processing of functional unit 300 as a whole.

In addition to a system program, nonvolatile memory 308 stores an application program that operates in an execution environment provided by the system program and security information 330 (see FIG. 1).

A memory card 315 is attachable to and detachable from memory card interface 314, and memory card interface 314 can write data such as an application program and various settings to memory card 315 or read data such as an application program and various settings from memory card 315.

Internal bus controller 322 is in charge of exchanging data with control unit 100 and functional unit 200 via an internal bus.

Indicator 324 notifies an operating state of functional unit 300 and the like and includes one or more LEDs disposed on a surface of the unit.

Although FIG. 5 illustrates the configuration example in which necessary functions are provided by processor 302 executing the programs, some or all of these provided functions may be implemented by using a dedicated hardware circuit (for example, ASIC or FPGA). Alternatively, a main part of functional unit 300 may be implemented by using hardware according to a general-purpose architecture (for example, an industrial personal computer based on a general-purpose personal computer). In this case, a plurality of OSs having different uses may be executed in parallel using a virtualization technology, and necessary applications may be executed on each OS.

D. Hardware Configuration Example of External Device 500

Figure 6:
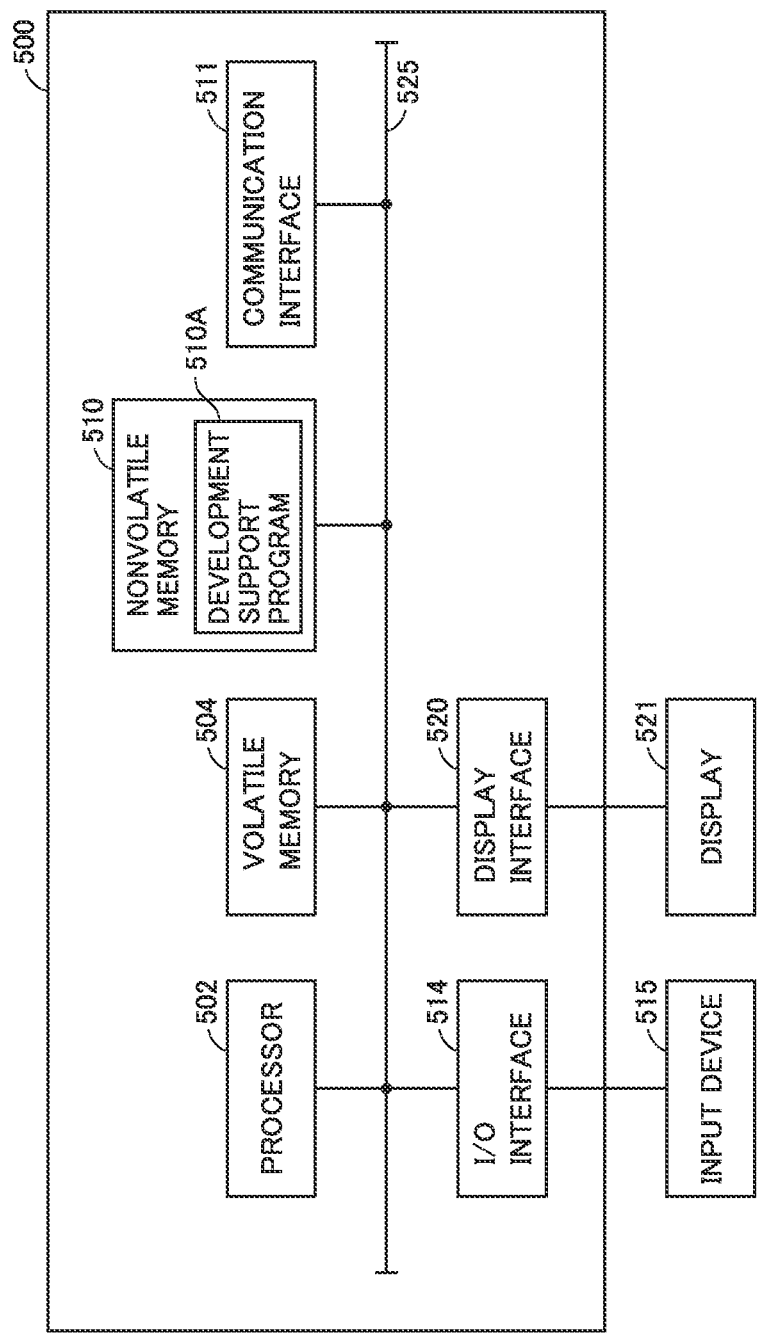
FIG. 6 is a schematic diagram illustrating a hardware configuration example of an external device constituting the information processing system according to the embodiment.

Next, a hardware configuration of external device 500 will be described in order with reference to FIG. 6. FIG. 6 is a schematic diagram illustrating a hardware configuration example of external device 500 constituting information processing system 1 according to the embodiment.

For example, external device 500 includes a computer configured in accordance with a general-purpose computer architecture. External device 500 includes a processor 502 such as a CPU or MPU, a volatile memory 504, a nonvolatile memory 510, a communication interface 511, an input/output (I/O) interface 514, and a display interface 520. These components are communicably connected to each other via an internal bus 525.

Processor 502 controls an operation of external device 500 by executing various control programs such as a development support program 510A and a browser application (not shown). Development support program 510A is a program that provides an environment for developing a control program (user program) of control system 2. Processor 502 reads the control program to be executed from nonvolatile memory 510 to volatile memory 504 in response to reception of execution instructions of various control programs such as development support program 510A and the browser application.

Communication interface 511 exchanges data with other communication devices via a network. The other communication devices include, for example, functional unit 200, a server, and the like. External device 500 may be configured to download various control programs such as development support program 510A from the other communication devices via communication interface 511.

I/O interface 514 is connected to input device 515 and captures a signal indicating a user operation from input device 515. Input device 515 typically includes a keyboard, a mouse, a touch panel, a touch pad, and the like, and accepts operations from the user. In the example in FIG. 6, external device 500 and input device 515 are shown as separate bodies, but external device 500 and input device 515 may be integrally configured.

Display interface 520 is connected to a display 521 and sends an image signal for displaying an image to display 521 in response to a command from processor 502 or the like. Display 521 is, for example, a liquid crystal display (LCD) or an organic electro luminescence (EL) display and presents various information to the user. Display 521 may display various screens provided by development support program 510A. In the example in FIG. 6, external device 500 and display 521 are shown as separate bodies, but external device 500 and display 521 may be integrally configured.

E. Unit Configuration Example of Information Processing System 1

Figure 7:
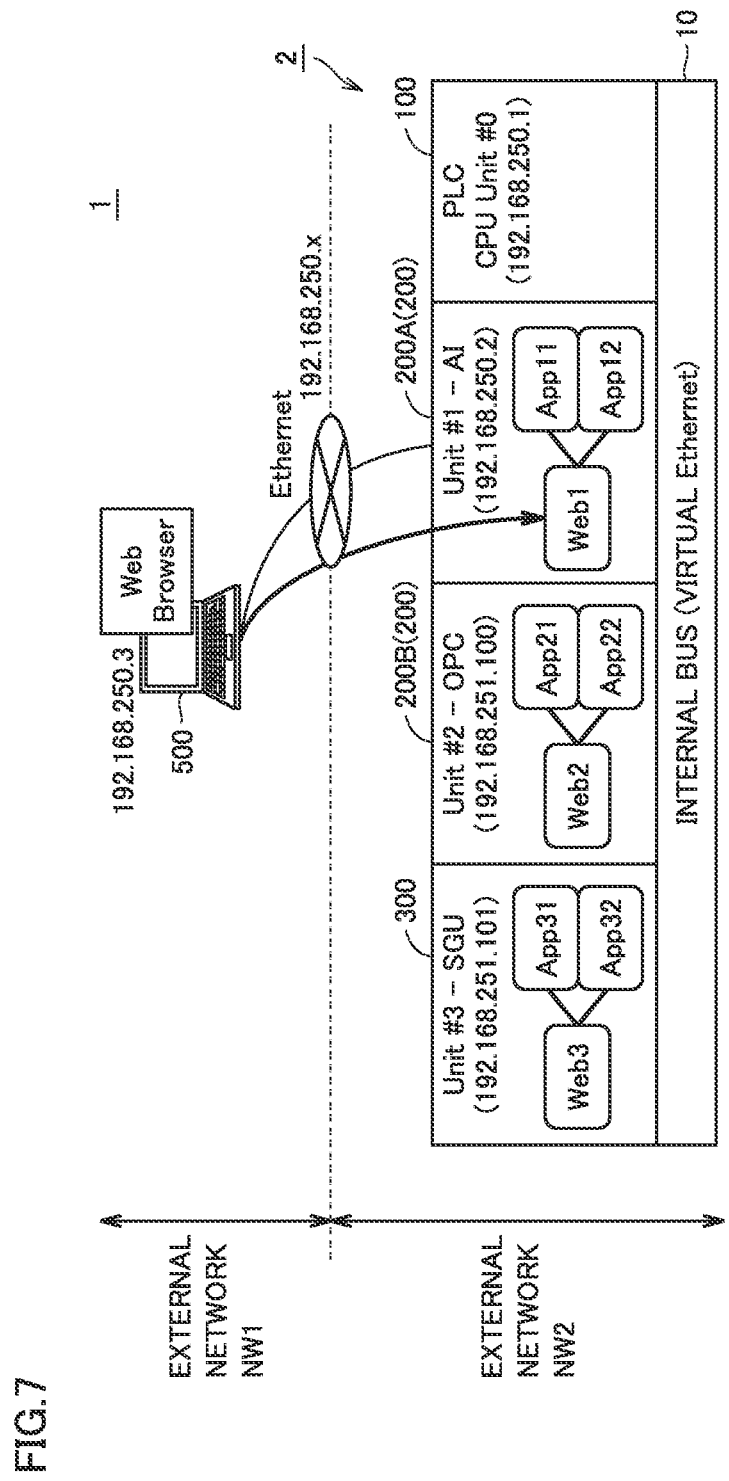
FIG. 7 is a diagram illustrating an example of a unit configuration of the information processing system according to the embodiment.

FIG. 7 is a diagram illustrating an example of a unit configuration of information processing system 1. A specific example of the unit configuration of information processing system 1 will be described with reference to FIG. 7.

As shown in FIG. 7, information processing system 1 includes control system 2 and external device 500. Control system 2 includes control unit 100, functional units 200A and 200B, and functional unit 300. Functional units 200A and 200B are examples of functional unit 200 (see FIG. 2). Control unit 100, functional units 200A and 200B, and functional unit 300 are connected to each other via internal bus 10. These units communicate with each other via internal bus 10. The communication is achieved by, for example, virtual Ethernet.

Functional unit 200 and external device 500 are connected to an external network NW1. An IP address "192.168.250.3" is assigned to external device 500. Functional unit 200 and external device 500 each have a physical communication port and are connected to external network NW1 via the communication port.

Control unit 100 and functional units 200A, 200B, and 300 are connected to an internal network NW2. A virtual IP address "192.168.250.1" is assigned to control unit 100. Further, a unit name "Unit #0" is assigned to control unit 100.

An IP address "192.168.250.2" is assigned to functional unit 200A. A unit name "Unit #1" is assigned to functional unit 200A. Functional unit 200A functions as a web server "Web1". Applications "App11" and "App12" are installed in functional unit 200A. Applications "App11" and "App12" are accessed from web server "Web1".

A virtual IP address "192.168.251.100" is assigned to functional unit 200B. In addition, a unit name "Unit #2" is assigned to functional unit 200B. Functional unit 200B functions as a web server "Web2". Applications "App21" and "App22" are installed in functional unit 200B. Applications "App21" and "App22" are accessed from web server "Web2".

A virtual IP address "192.168.251.101" is assigned to functional unit 300. In addition, a unit name "Unit #3" is assigned to functional unit 300. Functional unit 300 functions as a web server "Web3". Applications "App31" and "App32" are installed in functional unit 300. Applications "App31" and "App32" are accessed from web server "Web3".

F. Sequence Flow

Figure 8:
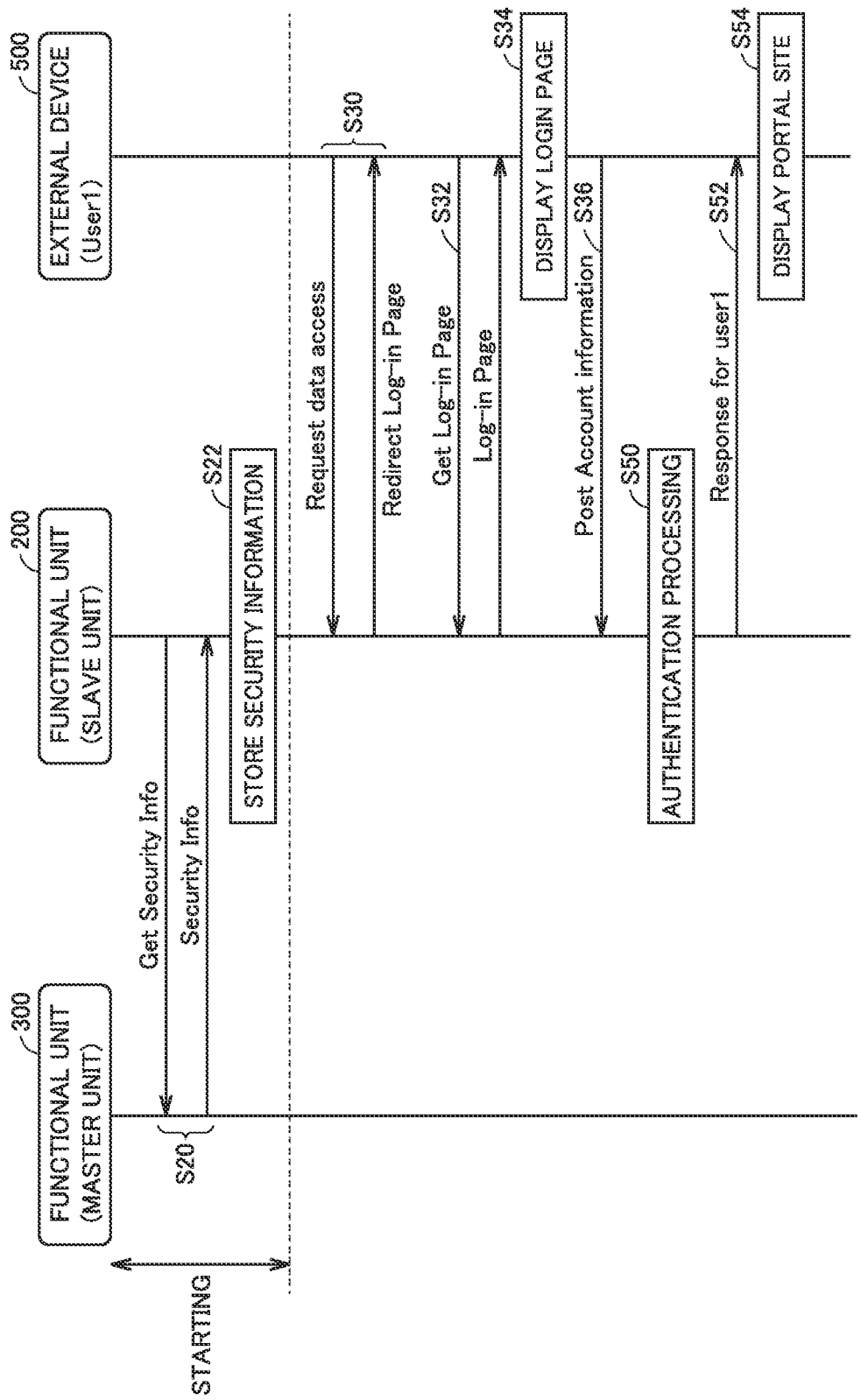
FIG. 8 is a diagram illustrating a data flow between the functional unit, the functional unit, and the external device.
Figure 9:
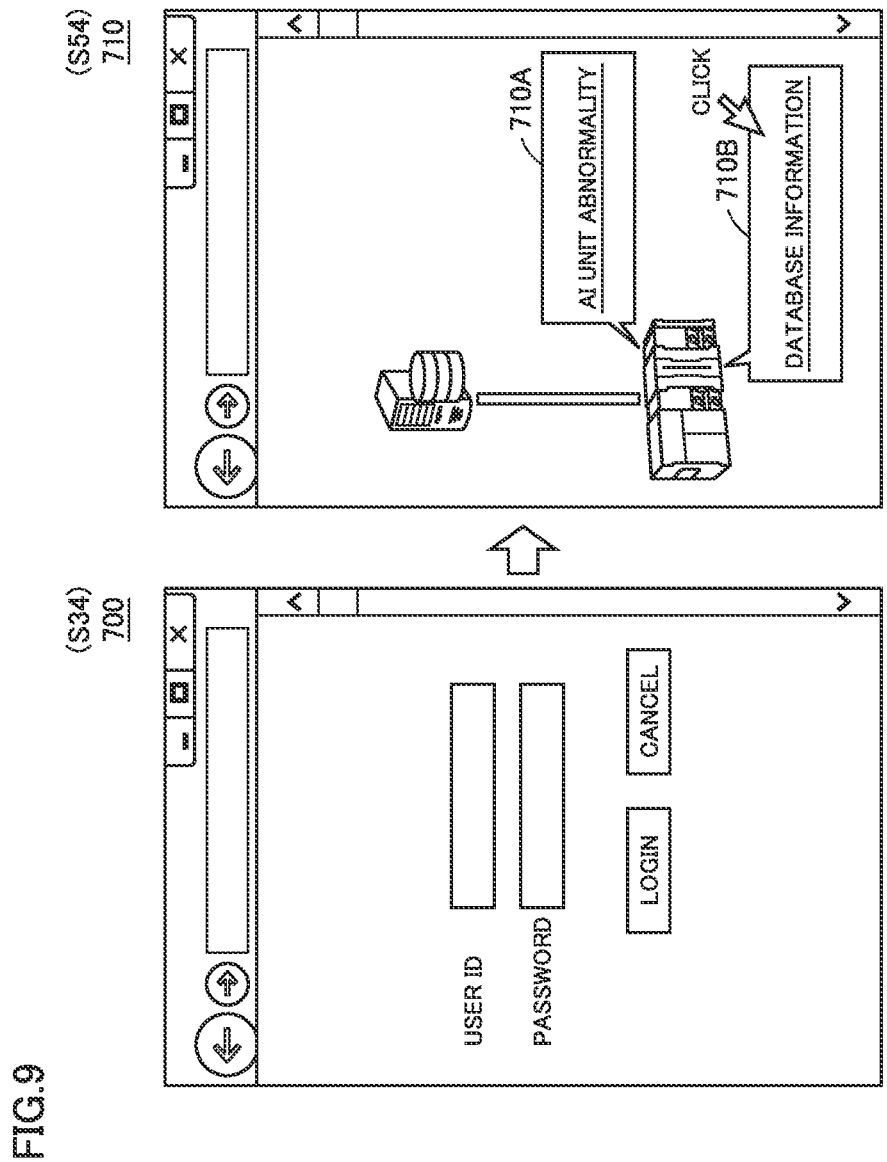
FIG. 9 is a diagram illustrating an example of a screen displayed on the external device according to the embodiment.

Next, a control flow of control system 2 will be described with reference to FIGS. 8 to 10. FIG. 8 is a diagram illustrating a data flow between functional unit 200, functional unit 300, and external device 500.

In step S20, it is assumed that control system 2 is started. On the basis of this start, a master-slave relationship is established between functional units 200 and 300. The master-slave relationship may be set in advance or may be arbitrarily set by the user. In the example in FIG. 8, it is assumed that functional unit 200 is set as a slave unit and functional unit 300 is set as a master unit. Functional unit 200 as a slave unit sends a request for acquisition of security information 330 to functional unit 300 as a master unit. Functional unit 300 sends security information 330 to functional unit 200 on the basis of receipt of the request for acquisition.

In step S22, functional unit 200 stores security information 330 received from functional unit 300 in volatile memory 206.

In step S30, it is assumed that external device 500 receives a request for data access to functional unit 200 from the user. At time of step S30, a login process to functional unit 200 has not been performed, and external device 500 is requested to input the account information. Specifically, functional unit 200 sends a URL of a login page to external device 500 on the basis of the request for data access received from external device 500, and redirects the user to the login page.

In step S32, external device 500 sends the request for access to the login page to functional unit 200 on the basis of the URL received from functional unit 200. On the basis of this request, functional unit 200 sends the accessed login page to external device 500.

In step S34, external device 500 displays the login page received from functional unit 200 on display 521 (see FIG. 6). FIG. 9 is a diagram illustrating an example of a screen displayed on external device 500. In FIG. 9, a login page 700 is shown as an example of the screen displayed on external device 500. Login page 700 accepts input of account information such as a user ID and a password. When a login button on login page 700 is pressed, the entered account information is sent to functional unit 200. When a cancel button on login page 700 is pressed, the entered account information is discarded, and login page 700 is closed.

In step S36, it is assumed that the login button on login page 700 is pressed. As a result, external device 500 sends the account information entered on login page 700 to functional unit 200.

In step S50, functional unit 200 authenticates the account information by referring to security information 330 (see FIG. 1) stored in volatile memory 206 on the basis of receipt of the account information from external device 500. In a case where the account information input to external device 500 is registered in security information 330 stored in volatile memory 206, functional unit 200 allows external device 500 to access data in functional unit 200.

Figure 10:
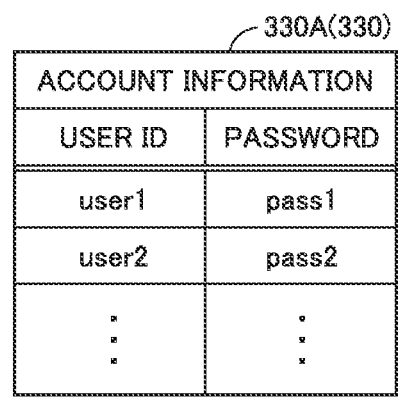
FIG. 10 is a diagram of registered account information included in security information.

FIG. 10 is a diagram of registered account information 330A included in security information 330. Registered account information 330A associates a password and the like with each user ID. Functional unit 200 acquires the password corresponding to the user ID from registered account information 330A by using the user ID included in input account information received from external device 500 as a key. Next, functional unit 200 compares the password acquired from registered account information 330A with the password included in the input account information received from external device 500. When these passwords match, functional unit 200 determines that the input account information received from external device 500 is registered in registered account information 330A.

In step S52, functional unit 200 sends a HyperText Markup Language (HTML) document of a portal site to external device 500 as a response to the request for data access in step S30.

In step S54, external device 500 configures a portal site on the basis of the received HTML document and displays the portal site on display 521 (see FIG. 6). FIG. 9 illustrates an example of a portal site 710 displayed on external device 500.

Portal site 710 provides a hyperlink with a link to the application installed on functional unit 200. In the example in FIG. 9, the link to application "App11" (see FIG. 7) installed on functional unit 200 is shown as a hyperlink 710A, and application "App12" (see FIG. 7) installed on functional unit 200) is shown as a hyperlink 710B. The user can use a function of application "App11" by selecting hyperlink 710A and can use a function of application "App12" by selecting hyperlink 710B.

G. First Modification

Figure 11:
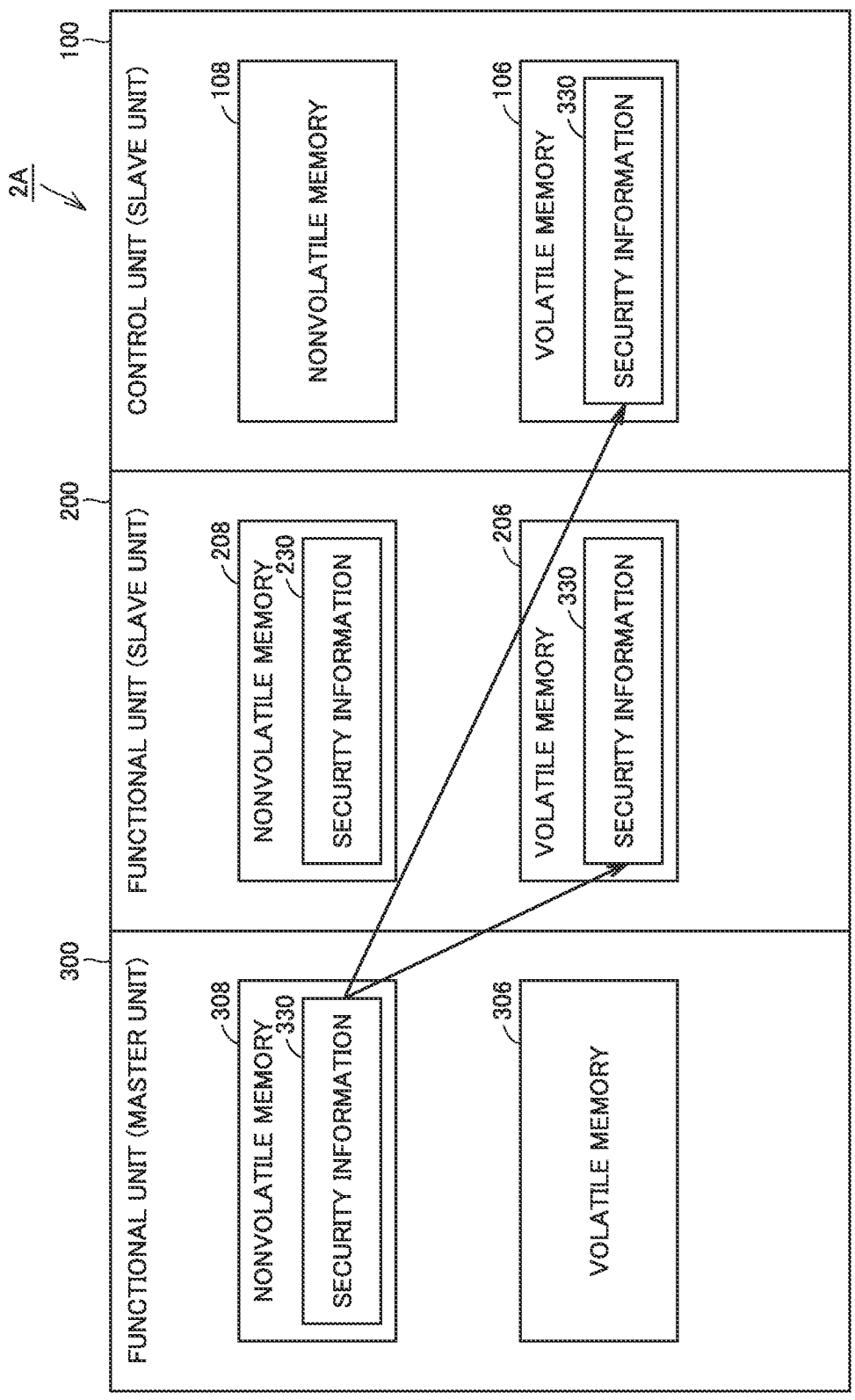
FIG. 11 is a diagram illustrating a configuration example of a control system according to a first modification.

Next, modifications of control system 2 will be described with reference to FIGS. 11 and 12. FIG. 11 is a diagram illustrating a configuration example of a control system 2A according to a first modification.

In control system 2, functional unit 200 as a slave unit uses security information 330 distributed from functional unit 300 as a master unit. On the other hand, in control system 2A according to this modification, functional unit 200 not only uses security information 330 received from functional unit 300, but also uses security information 230 stored in advance in functional unit 200. Since the other points are as described above, the duplicated description will not be repeated below.

As shown in FIG. 11, security information 230 is stored in advance in nonvolatile memory 208 of functional unit 200. Further, functional unit 200 stores security information 330 distributed from functional unit 300 in volatile memory 206. As a result, functional unit 200 has security information 230 and security information 330.

Functional unit 200 merges security information 230 and security information 330. FIG. 12 is a diagram illustrating a process of merging security information 230 and security information 330. Specifically, FIG. 12 illustrates registered account information 230A included in security information 230, registered account information 330A included in security information 330, and a merge result 233 of registered account information 230A and 330A.

Figure 12:
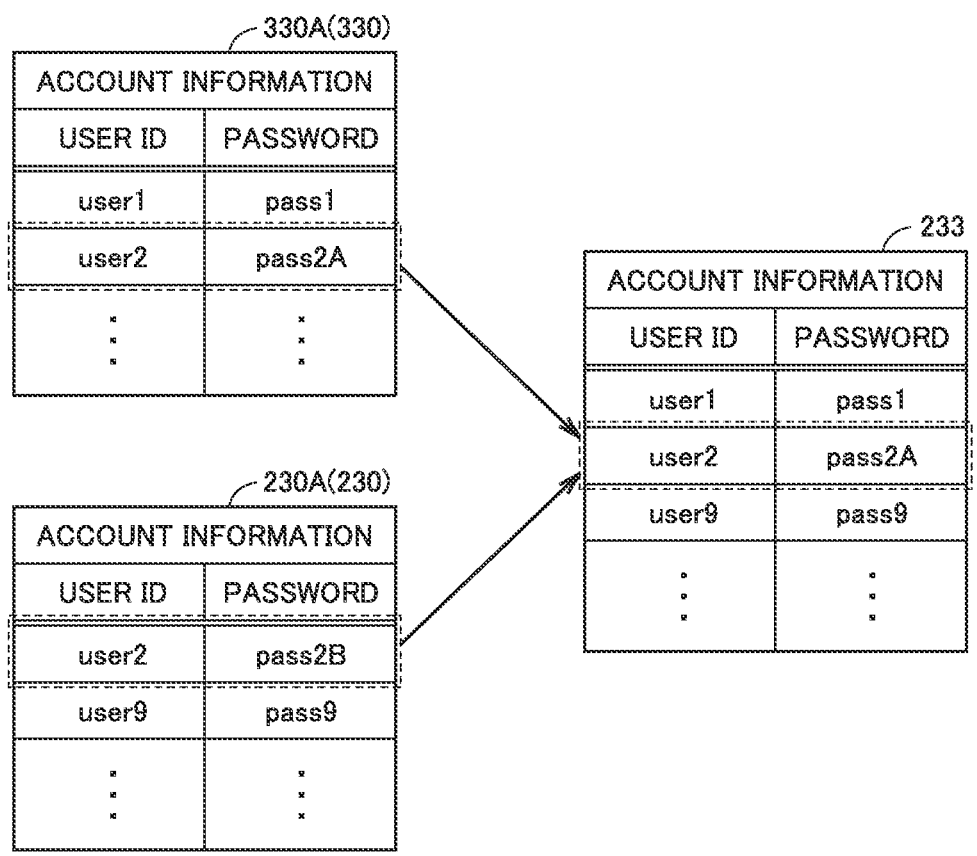
FIG. 12 is a diagram illustrating a process of merging the security information.

As shown in FIG. 12, information may conflict between information included in security information 230 and information included in security information 330. The term "conflict" as used herein means that unique information such as a user ID is duplicated. In the example in FIG. 12, a user ID "user2" included in registered account information 230A and a user ID "user2" included in registered account information 330A conflict with each other.

Functional unit 200 determines which of the conflicting information to prioritize in accordance with a merge rule when the information conflicts between the information included in security information 230 (first security information) and the information included in security information 330 (second security information).

For example, a priority is set in advance for each functional unit, and functional unit 200 prioritizes information acquired from the unit having a high priority. For example, it is assumed that the priority is set such that the priority of functional unit 300 as a master unit is higher than as a slave unit. In this case, functional unit 200 prioritizes security information 330 received from functional unit 300 over security information 230 stored in functional unit 200. As a result, the account information of user ID "user2" and a password "pass2A" is prioritized over the account information of user ID "user2" and a password "pass2B". This prevents conflicts of the account information.

H. Second Modification

Figure 13:
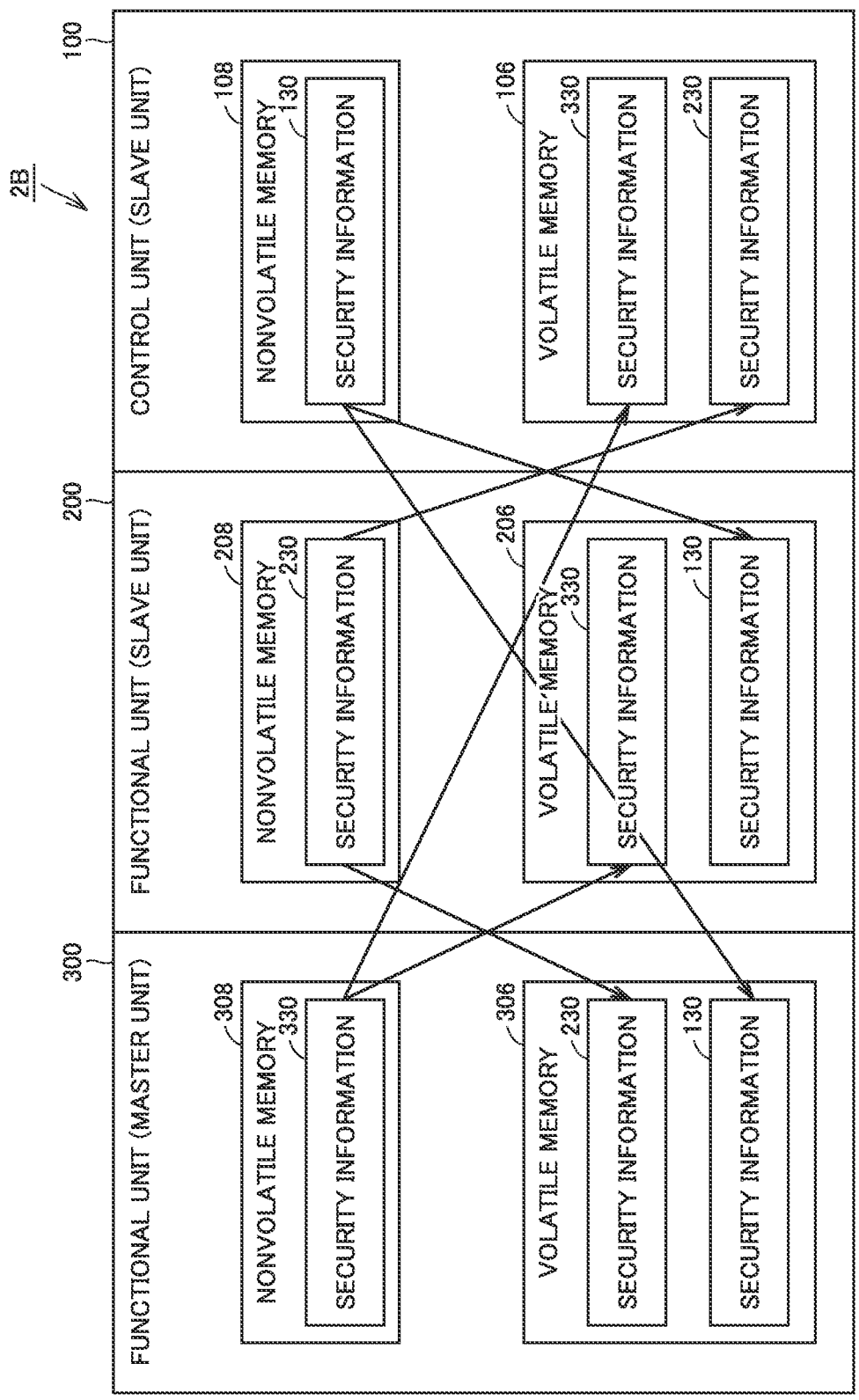
FIG. 13 is a diagram illustrating a configuration example of a control system according to a second modification.

Next, another modification of control system 2 will be described with reference to FIG. 13. FIG. 13 is a diagram illustrating a configuration example of a control system 2B according to a second modification.

In control system 2, the master unit distributes the security information to the slave units. On the other hand, in control system 2B according to this modification, not only the master unit distributes security information to the slave units, but also the slave units distribute security information to the other units. Since the other points are as described above, the duplicated description will not be repeated below.

As shown in FIG. 13, control unit 100 as a slave unit, has a volatile memory 106 and a nonvolatile memory 108. Security information 130 is stored in nonvolatile memory 108 in advance.

Functional unit 200 as a slave unit has a volatile memory 206 and a nonvolatile memory 208. Security information 230 is stored in advance in volatile memory 206.

Functional unit 300 as a master unit has a volatile memory 306 and a nonvolatile memory 308. Security information 330 is stored in advance in volatile memory 306.

Control unit 100 distributes security information 130 stored in nonvolatile memory 108 to functional units 200 and 300 at a predetermined timing. Functional unit 200 stores security information 130 received from control unit 100 in volatile memory 206. Similarly, functional unit 300 stores security information 130 received from control unit 100 in volatile memory 306.

Functional unit 200 distributes security information 230 stored in nonvolatile memory 208 to control unit 100 and functional unit 300 at a predetermined timing. Control unit 100 stores security information 230 received from functional unit 200 in volatile memory 106. Similarly, functional unit 300 stores security information 230 received from functional unit 200 in volatile memory 306.

Functional unit 300 distributes security information 330 stored in nonvolatile memory 208 to control unit 100 and functional unit 200 at a predetermined timing. Control unit 100 stores security information 330 received from functional unit 300 in volatile memory 106. Similarly, functional unit 200 stores security information 330 received from functional unit 300 in volatile memory 206.

The timing at which security information 130, 230, and 330 is distributed to other units is not limited. In a certain aspect, security information 130, 230, and 330 is distributed to each unit at a timing at which power of control system 2B is turned on. In another aspect, security information 130, 230, and 330 is distributed to each unit at predetermined intervals. In still another aspect, security information 130, 230, and 330 is distributed to each unit at a timing of receiving an acquisition instruction or update instruction by a user operation.

After receiving the security information from the other units, each unit of control unit 100 and functional units 200 and 300 merges security information 130, 230, and 330 in accordance with a predetermined merge rule. At this time, when information conflicts between security information 130, 230, and 330, each unit resolves the information conflict by a method described in "G. First modification".

Although in FIG. 13, the example has been described in which the security information is distributed to all the other units, the security information does not have to be distributed to all the other units. For example, a unit that allows distribution of the security information and a unit that prohibits distribution of the security information are predetermined, and each unit may distribute the security information only to other units that are allowed to distribute the security information.

I. Third Modification

Figure 14:
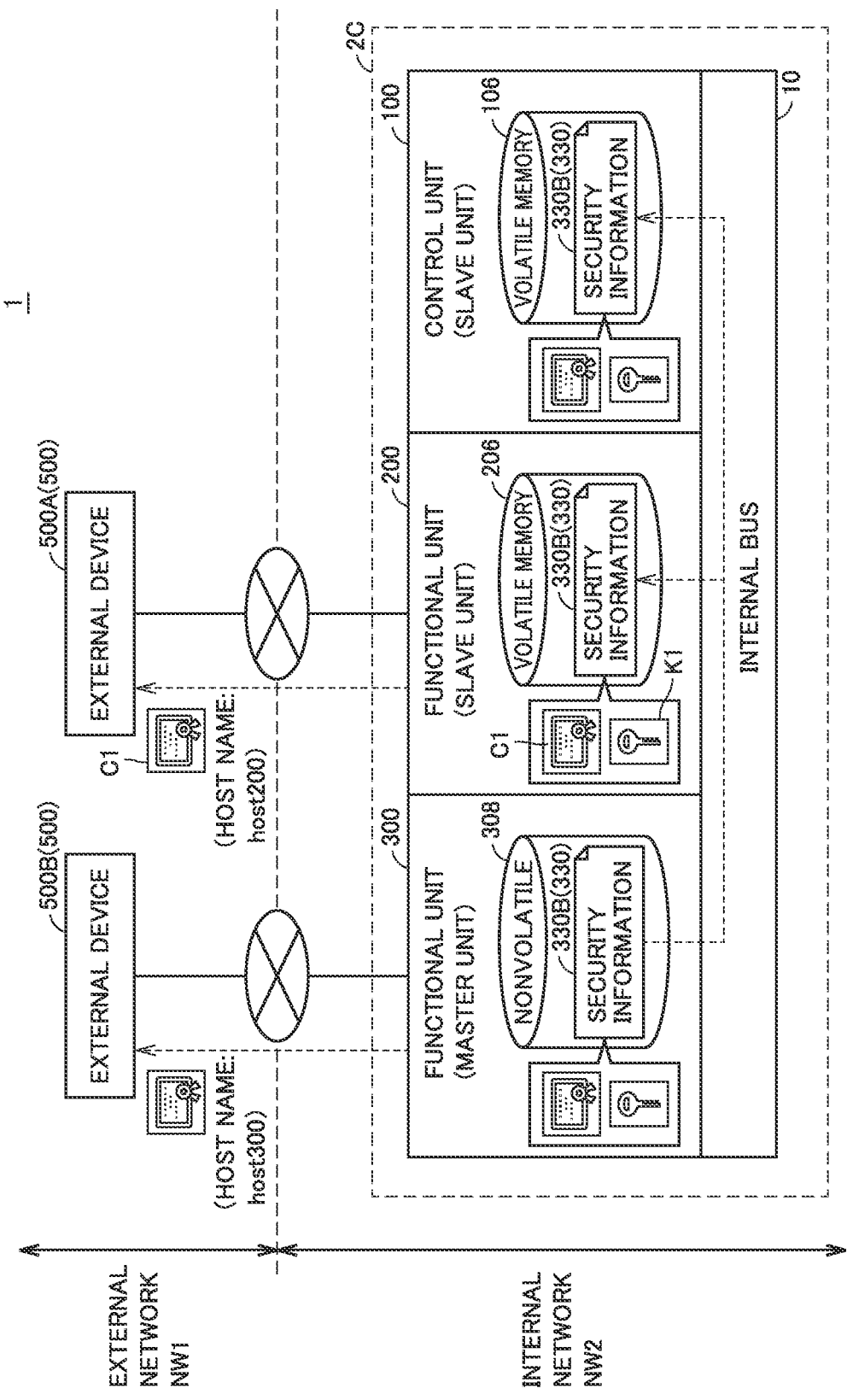
FIG. 14 is a diagram illustrating a configuration example of a control system according to a third modification.

Next, another modification of control system 2 will be described with reference to FIGS. 14 and 15. FIG. 14 is a diagram illustrating a configuration example of a control system 2C according to a third modification.

In the above, the example in which security information 330 includes the account information has been described. On the other hand, in this modification, security information 330 includes key information 330B such as a private key and a digital certificate used for encryption. Since the other points are as described above, the duplicated description will not be repeated below.

As shown in FIG. 14, security information 330 including key information 330B is stored in nonvolatile memory 308 of functional unit 300 as a master unit. FIG. 15 is a diagram of key information 330B included in security information 330. Key information 330B includes one or more sets of a digital certificate and a private key.

The digital certificate includes a public key used for encryption. A digital certificate is a data set for certifying an owner of the public key. Typically, digital certificates are pre-issued by a certification body called a certificate authority (CA).

With reference to FIG. 14 again, functional unit 300 as a master unit sends security information 330 including key information 330B to control unit 100 and functional unit 200 as slave units at a predetermined timing. Control unit 100 stores security information 330 received from functional unit 300 in volatile memory 106. Similarly, functional unit 200 stores security information 330 received from functional unit 300 in volatile memory 206.

Each unit constituting control system 2C achieves secure communication with external device 500 by using key information 330B held by each unit. FIG. 14 illustrates an example in which functional unit 200 is performing secure communication with an external device 500A and an example in which functional unit 300 is performing secure communication with an external device 500B.

For example, functional units 200 and 300 achieve secure communication with external devices 500A and 500B by Secure Sockets Layer (SSL) communication.

Specifically, functional unit 200 as a slave unit sends a digital certificate C1 stored in volatile memory 206 to external device 500A in response to reception of a request for acquisition of data stored in functional unit 200 from external device 500A. Digital certificate C1 generally includes a host name of a registrant. As described above, digital certificate C1 is distributed from functional unit 300, but when the host name specified in digital certificate C1 is functional unit 300 although a sender of digital certificate C1 is functional unit 200, external device 500A cannot authenticate the sender correctly. Thus, a multi-domain certificate or a wildcard certificate is used as digital certificate C1. A multi-domain certificate is a certificate that can authenticate multiple domains with one digital certificate C1. A wildcard certificate is a certificate that can authenticate all subdomains belonging to the same hierarchy of "*." by adding "*." as a common name.

External device 500A verifies digital certificate C1 received from functional unit 200 and determines whether the sender of digital certificate C1 is a legitimate sender. When external device 500A determines that the sender of digital certificate C1 is a legitimate sender, external device 500A generates a common key (not shown). After that, external device 500A encrypts the generated common key using the public key included in digital certificate C1 and sends the encrypted common key to functional unit 200.

In response to reception of the encrypted common key from external device 500A, functional unit 200 decrypts the common key by using a private key K1 included in key information 330B. By the above processing, the common key is safely sent from functional unit 200 to external device 500A. In the subsequent communication, functional unit 200 and external device 500A encrypt data using the common key and then exchange the data with each other.

Similarly, functional unit 300 uses key information 330B stored in nonvolatile memory 308 to perform SSL communication with external device 500B.

J. Appendix

As described above, the present embodiment includes the following disclosure.

Configuration 1

A control system (2) comprising a plurality of units, wherein
the plurality of units comprise
a master unit (300) connected to a bus (10), and
a slave unit (200) connected to the bus (10) and configured to communicate with the master unit (300) via the bus (10),
the master unit (300) comprises a nonvolatile memory (308) configured to store first security information (330) as information to be concealed,
the slave unit (200) comprises a volatile memory (206), and
the slave unit (200) is configured to receive the first security information (330) from the master unit (300) at a predetermined timing and store the first security information (330) in the volatile memory (206).

Configuration 2

The control system according to configuration 1, wherein the predetermined timing includes a timing at which power of control system (2) is turned on.

Configuration 3

The control system according to configuration 1 or 2, wherein
the first security information (330) includes account information of a user,
in response to reception of a request for data access to slave unit (200) from an external device (500) configured to be communicable with the slave unit (200), the slave unit (200) requests the external device (500) to input account information, and
in a case where the account information input to the external device (500) is registered in the first security information (330) stored in the volatile memory (206), the slave unit (200) allows data access to the slave unit (200) by the external device (500).

Configuration 4

The control system according to any one of configurations 1 to 3, wherein
the first security information (330) includes a digital certificate, and
in response to reception of a request for acquisition of data stored in slave unit (200) from the external device (500) configured to be communicable with the slave unit (200), the slave unit (200) sends the digital certificate stored in the volatile memory (206) to the external device (500).

Configuration 5

The control system according to any one of configurations 1 to 4, wherein
the slave unit (200) further comprises a nonvolatile memory (208) configured to store second security information (230) as information to be concealed, and
in a case where there is conflicting information between information included in the first security information (330) and information included in the second security information (230), the slave unit (200) determines which of the conflicting information to prioritize in accordance with a predetermined rule.

Configuration 6

The control system according to configuration 5, wherein the master unit (300) is configured to receive the second security information (230) from the slave unit (200) at the predetermined timing and store the second security information (230) in the volatile memory (306) of the master unit (300).

Configuration 7

The control system according to any one of configurations 1 to 6, wherein
the slave unit (200) comprises a control unit (100) that controls a drive device.

Configuration 8

A control method of a control system (2) includes a plurality of units,
the plurality of units comprising
a master unit (300) connected to a bus (10), and
a slave unit (200) connected to the bus (10) and configured to communicate with master unit (300) via bus (10),
the control method comprising:
storing, by master unit (300), first security information (330) as information to be concealed in a nonvolatile memory (308) of the master unit (300),
receiving, by slave unit (200), the first security information (330) from the master unit (300) at a predetermined timing, and
storing, by slave unit (200), the first security information (330) received from the master unit (300) in a volatile memory (206) of the slave unit (200).

It should be understood that the embodiment disclosed herein is illustrative in all respects and not restrictive. The scope of the present invention is defined not by the above description but by the claims and is intended to include meanings equivalent to the claims and all modifications within the scope.

REFERENCE SIGNS LIST

1: Information processing system, 2, 2A, 2B, 2C: Control system, 10, 525: Internal bus, 100: Control unit, 102, 202, 302, 502: Processor, 104, 204, 304: Chipset, 106, 206, 306, 504: Volatile memory, 108, 208, 308, 510: Nonvolatile memory, 110, 210: Communication controller, 112: USB controller, 114, 214, 314: Memory card interface, 115, 215, 315: Memory card, 116, 118, 120, 216, 218: Network controller, 122, 322: Internal bus controller, 124, 224, 324: Indicator, 130, 230, 330: Security information, 200, 200A, 200B, 300, 400: Functional unit, 212, 511: Communication interface, 230A, 330A: Registered account information, 232: Communication control program, 233: Merge result, 330B: Key information, 450: Power supply unit, 500, 500A, 500B: External device, 510A: Development support program, 514: Interface, 515: Input device, 520: Display interface, 521: Display, 700: Login page, 710: Portal site, 710A, 710B: Hyperlink.

The invention claimed is:

1. A control system comprising a plurality of units, wherein
the plurality of units comprise:
a master unit connected to a bus, and
a slave unit that is connected to the bus and that communicates with the master unit via the bus,
the master unit comprises a nonvolatile memory that stores first security information as information to be concealed,
the slave unit comprises a volatile memory, and a nonvolatile memory configured to store second security information as information to be concealed,
the slave unit receives the first security information from the master unit at a predetermined timing and temporarily stores the first security information in the volatile memory,
the first security information includes one or both of account information of a user and a digital certificate,
in response to reception of a request for data access to the slave unit from an external device that is communicable with the slave unit, the slave unit requests the external device to input account information,
in a case where the account information input to the external device is registered in the first security information stored in the volatile memory, the slave unit allows data access to the slave unit by the external device,
in a case where a power of the control system is turned off, the first security information is erased from the volatile memory of the slave unit, and
in a case where there is conflicting information between information included in the first security information and information included in the second security information, the slave unit determines which of the conflicting information to prioritize in accordance with a predetermined rule.

2. The control system according to claim 1, wherein the predetermined timing includes a timing at which power of the control system is turned on.

3. The control system according to claim 1, wherein
in response to reception of a request for acquisition of data stored in the slave unit from the external device that is communicable with the slave unit, the slave unit sends the digital certificate stored in the volatile memory to the external device.

4. The control system according to claim 1, wherein the master unit receives the second security information from the slave unit at the predetermined timing and stores the second security information in the volatile memory of the master unit.

5. The control system according to claim 1, wherein the slave unit comprises a control unit that controls a drive device.

6. A control method of a control system, the control method comprising:
storing, by a master unit, first security information as information to be concealed in a nonvolatile memory of the master unit;
receiving, by a slave unit, the first security information from the master unit at a predetermined timing;
storing, temporarily by the slave unit, the first security information received from the master unit in a volatile memory of the slave unit,
wherein the slave unit further comprises a nonvolatile memory that stores second security information as information to be concealed, and
wherein the first security information includes one or both of account information of a user and a digital certificate;
in response to reception of a request for data access to the slave unit from an external device, requesting, by the slave unit, the external device to input account information;
in a case where the account information input to the external device is registered in the first security information stored in the volatile memory, allowing, by the slave unit, the external device to access data in the slave unit; and
in a case where there is conflicting information between information included in the first security information and information included in the second security information, determining, by the slave unit, which of the conflicting information to prioritize in accordance with a predetermined rule, wherein
in a case where a power of the control system is turned off, the first security information is erased from the volatile memory of the slave unit.

7. The control method according to claim 6, wherein the predetermined timing includes a timing at which power of the control system is turned on.

8. The control method according to claim 6, wherein
the method further comprises:
in response to reception of a request for acquisition of data stored in the slave unit from the external device, sending, by the slave unit, the digital certificate stored in the volatile memory to the external device.

9. The control method according to claim 6, further comprising:
receiving, by the master unit, the second security information from the slave unit at the predetermined timing, and
storing, by the master unit, the second security information in the volatile memory of the master unit.

10. The control method according to claim 6, further comprising controlling, by a control unit included in the slave unit, a drive device.

* * * * *